United States Patent
deWet et al.

(10) Patent No.: US 11,468,471 B2
(45) Date of Patent: Oct. 11, 2022

(54) AUDIENCE EXPANSION ACCORDING TO USER BEHAVIORS

(71) Applicant: Pinterest, Inc., San Francisco, CA (US)

(72) Inventors: Stephanie deWet, Seattle, WA (US); Mukund Narasimhan, Bellevue, WA (US); Jiafan Ou, Clyde Hill, WA (US); Jian Huang, San Mateo, CA (US)

(73) Assignee: Pinterest, Inc., San Francisco, CA (US)

( * ) Notice: Subject to any disclaimer, the term of this patent is extended or adjusted under 35 U.S.C. 154(b) by 184 days.

(21) Appl. No.: 16/271,033

(22) Filed: Feb. 8, 2019

(65) Prior Publication Data

US 2020/0184515 A1    Jun. 11, 2020

Related U.S. Application Data

(60) Provisional application No. 62/800,356, filed on Feb. 1, 2019, provisional application No. 62/777,596, filed on Dec. 10, 2018.

(51) Int. Cl.
*G06Q 30/00* (2012.01)
*G06Q 30/02* (2012.01)

(52) U.S. Cl.
CPC ................ *G06Q 30/0254* (2013.01)

(58) Field of Classification Search
None
See application file for complete search history.

(56) References Cited

U.S. PATENT DOCUMENTS

| | | | |
|---|---|---|---|
| 2012/0054040 A1* | 3/2012 | Bagherjeiran | G06Q 30/0255 705/14.66 |
| 2013/0124298 A1* | 5/2013 | Li | G06Q 30/0241 705/14.42 |
| 2014/0236715 A1 | 8/2014 | Aronowich et al. | |
| 2016/0048880 A1* | 2/2016 | Linden | H04L 67/42 705/14.66 |
| 2017/0178197 A1 | 6/2017 | Hong et al. | |
| 2017/0330239 A1 | 11/2017 | Luo et al. | |
| 2018/0150883 A1* | 5/2018 | Davin | G06Q 30/0269 |
| 2018/0157664 A1* | 6/2018 | Howell | G06N 20/10 |
| 2019/0286943 A1* | 9/2019 | Leskovec | G06K 9/6276 |
| 2020/0184515 A1* | 6/2020 | deWet | G06Q 30/0254 |

OTHER PUBLICATIONS

Google Developers, Embeddings—Machine Learning Crash Course, Oct. 2, 2018, 4 pp (Year: 2018).*
International Search Report and Written Opinion in International Application No. PCT/US2019/065526, dated Mar. 6, 2020.

* cited by examiner

*Primary Examiner* — Michael W Schmucker
(74) *Attorney, Agent, or Firm* — Athorus, PLLC

(57) ABSTRACT

Systems and methods are presented for carrying out a task to an expanded group of users on behalf of a third party. In operation, an online service receives task information corresponding to a task from a third party. Additionally, the online service receives a seed group of users from the third party. The online service determines an intersection between the seed group of users and the online service's corpus of users. This intersection of users is then used to identify an expanded set of users of the online service's corpus of users. The online service then carries out the task on behalf of the third party, targeting the expanded set of users.

14 Claims, 9 Drawing Sheets

AUDIENCE EXPANSION ACCORDING TO USER BEHAVIORS

CROSS-REFERENCE TO RELATED APPLICATIONS

This application claims the benefit of provisional patent application, U.S. Application No. 62/777,596, filed on Dec. 10, 2018, the entirety of which is incorporated herein by reference. This application further claims the benefit of provisional patent application, U.S. Application No. 62/800,356, filed on Feb. 1, 2019, the entirety of which is incorporated herein by reference.

BACKGROUND

In the world of online advertising, an advertisers' goal is to find a new audience for their products. Indeed, while an advertiser will typically have a body of users to which they advertise, advertisers can grow their business and revenue by expanding that body of users to which they advertise.

Advertisers have many available controls to specify a target audience for an advertisement and/or advertisement campaign. Indeed, often an advertiser will filter its body of user data to identify certain users with specific interests, demographics, search keywords, and the like. This doesn't expand the audience for the advertiser, but allows the advertiser to access a specific, desired group of users.

A method an advertiser might use to target users for advertisements is a technique called "audience look-alike" targeting, which allows the advertiser to provide a set of its own high value customers to an advertising platform. The advertising platform, which has and maintains its own set of users, will then find similar users among its set of users, i.e., users that are similar to or "look like" the high value customers of the advertiser. Typically, the advertisement platform then directs the advertisements of the advertiser to that expanded group of "look-alike" users. This technique has the added benefit of reaching customers/users that are unknown to the advertiser.

In "look-alike" targeting, the advertiser is able to apply reasoning, metrics and logic that it knows about its own customer or client base when identifying the seed group of users for the advertising platform. However, for security purposes, this information and/or rationale is not conveyed to the advertising platform. As a result, the advertising platform is blind to any motivation the advertiser employed in selecting the seed group of users.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
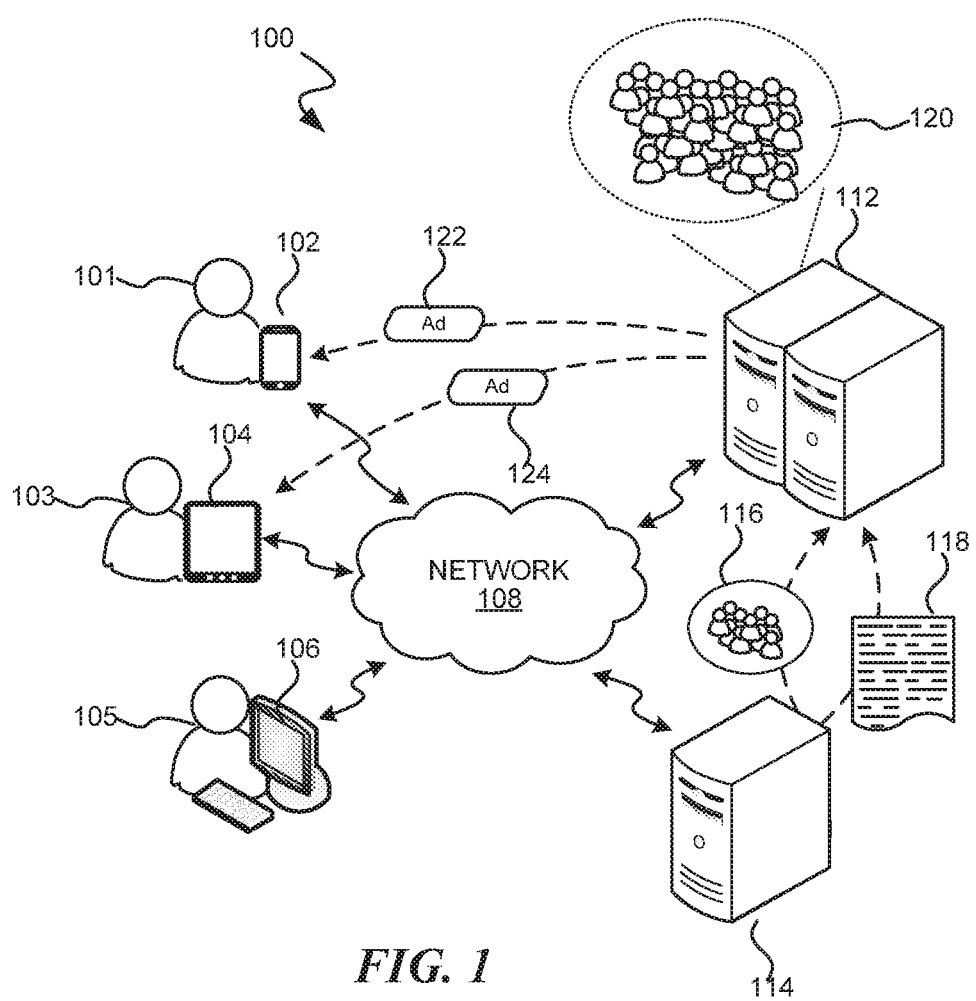
FIG. 1 is a block diagram illustrating an exemplary network environment suitable for implementing aspects of the disclosed subject matter.

Turning to the figures, FIG. 1 is a block diagram illustrating an exemplary network environment 100 suitable for implementing aspects of the disclosed subject matter. The exemplary network environment 100 includes one or more persons/computer users (or more simply, "users") that connect to a network 108 via a computing device. By way of illustration, the exemplary network environment includes users 101, 103 and 105 connecting to network 108 via computing devices 102, 104 and 106 respectively. As will be readily appreciated, users can connect to the network 108, via their computing devices, using wired and/or wireless connection. By way of illustration and not limitation, suitable user computing devices include mobile phone devices (such as computing device/mobile phone 102), tablet computing devices (such as computing device/tablet computer 104), laptop computers, the so-called phablet computing devices (the hybrid phone/tablet computing devices), desktop computing devices (such as computing device/desktop computer 106), mini- and/or mainframe computing devices, and the like.

By way of definition, the network 108 is a computer network, also referred to as a data network, that is fundamentally a telecommunications network which allows computers and/or computing devices, such as computing devices 102, 104 and 106, to exchange information and data. In computer networks, networked computing devices, sometimes referred to as nodes in the network, exchange data with each other using a data link. As mentioned above, the connections between nodes are established using either cable media (wired connections) or wireless media (wireless connections). While the best-known computer network is the Internet, the disclosed subject matter is not limited to the Internet. Indeed, elements of the disclosed subject matter may be suitably and satisfactorily implemented on wide area networks, local area networks, enterprise networks, and the like.

Also included in the exemplary network environment 100 is an online service 112. By way of definition, an online service corresponds to a service that interacts with and is accessible to users (via computing devices) over a network. Online services will typically provide one or more interfaces, such as an application programming interface (API) or user interface, by which the various users can interact with the online service. Social networking sites are non-limiting examples of online services, just as news organization sites are also non-limiting examples of online services. As will be readily appreciated, many of the online services are ad-supported, meaning that the online service derives some (if not all) of its revenue from serving advertisements to the service's users. Users of an online service are also referred to as subscribers in that the users sign up for or subscribe to the online service to gain access to the features and benefits of the online service. According to aspects of the disclosed subject matter and as shown in the exemplary network environment 100, the online service 112 is configured to provide online services to a body of computer users, such as users 101, 103 and 105. Some or all of the body of computer users may be subscribers of the online service.

According to various aspects of the disclosed subject matter, the online service 112 may be configured to provide advertisements or "ads" to its users in the course of interacting with the users. In this regard, the online service is an ad-supported online service. As shown in the exemplary network environment 100, in the course of interacting with the online service 112, users 101 and 103 are provided ads, 122 and 124, in the information sent from the online service to the user's computing devices.

Also shown in the exemplary network environment 100 is a vendor 114 connected to the network 108. According to aspects of the disclosed subject matter and as will be readily appreciated by those skilled in the art, one or more vendors may contract or coordinate with the online service 112 to serve the vendor's advertisements, such as ads 122 and 124, to the computer users interacting with the online service. Indeed, according to aspects of the disclosed subject matter and as will be discussed in greater detail below, in order to expand the receiving audience of computer users, the vendor 114 provides information to the online service 112 in regard to one or more advertisement campaigns. This information includes a seed group 116 of users that are known to the vendor. This seed group 116 comprises users that, presumably, have specific, valued qualities that the vendor wishes to "duplicate" in an expanded set of users by the online service 112. Of course, the basis on which a vendor identifies the seed group of users is not generally passed on to or shared with the advertisement platform. For its part and as will be described below, the online service 112 identifies an expanded set 120 of users from its body of users that are similar to those users of the seed group 116, based on its own determination of similarity. Additionally, the vendor 114 provides advertisement campaign information 118 that describes the parameters of the advertisement campaign to be conducted with regard to the expanded set 120 of users.

Figure 2:
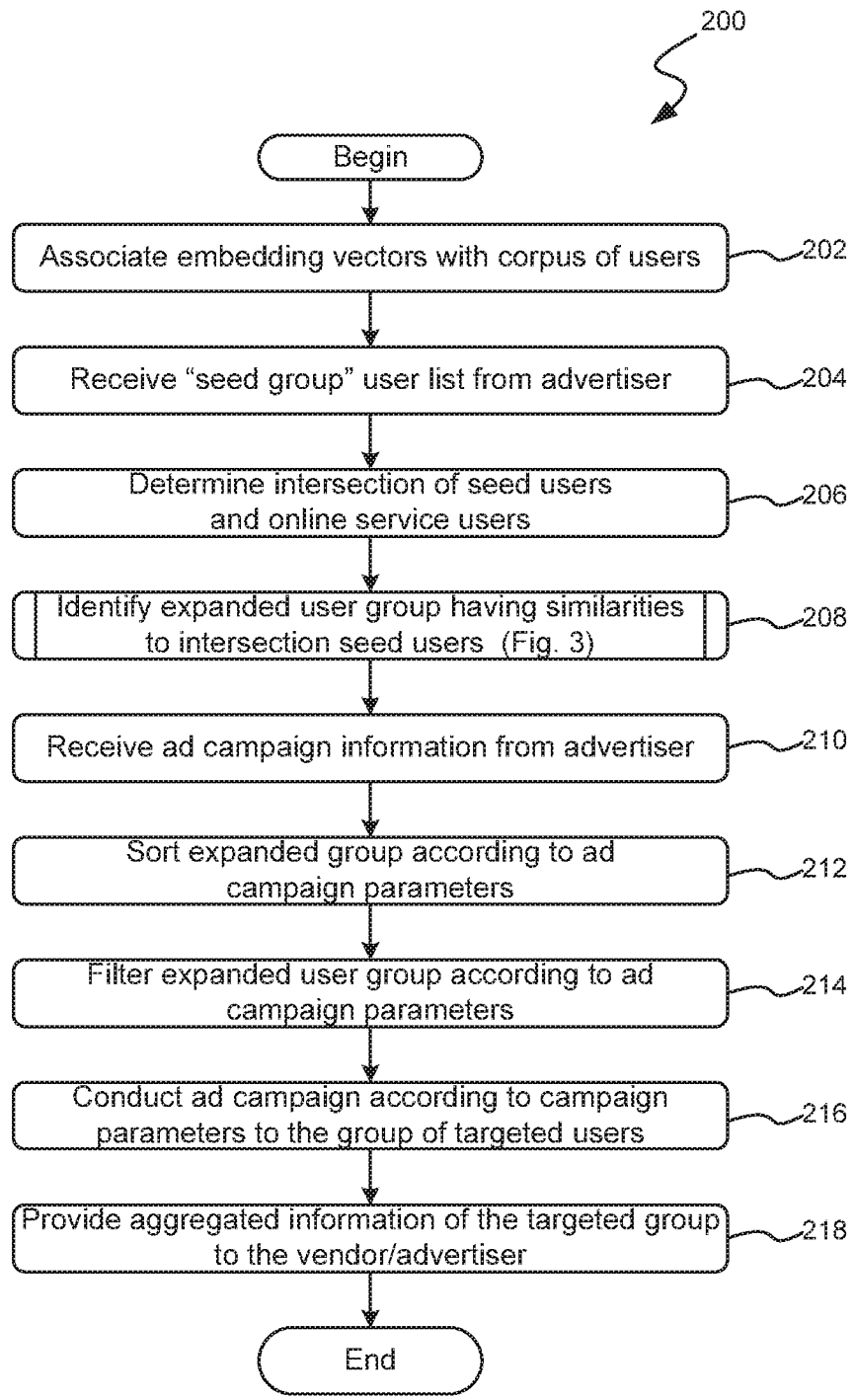
FIG. 2 is a flow diagram illustrating an exemplary routine suitable for identifying an expanded set of users of an online service for an advertiser based on the user interactions with the online service and in accordance with aspects of the disclosed subject matter.

Regarding the process of determining an expanded set 120 of users, reference is now made to FIG. 2. FIG. 2 is a flow diagram illustrating an exemplary routine 200 suitable for identifying the expanded set 120 of users of an online service 112 for an advertiser 114 based on user interactions with the online service and in accordance with aspects of the disclosed subject matter.

Beginning at block 202, each of the users of the online service 112 are associated with an embedding vector. This associated embedding vector is typically generated by a trained machine learning model that determines the values of the embedding vector according to user information possessed by the online service. According to aspects of the disclosed subject matter, this user information includes the behaviors of the users with the online service. Behaviors correspond to interactions a user has with the online service. By way of illustration and not limitation, behaviors include a post action of a user corresponding to posting/adding content to the online service, an aggregation action where a user aggregates content items on the online service, a view action where the user views one or more items of content on the online service, and the like. Additionally, the user information may include demographic information about the users and may further include express and/or implied likes and dislikes with regard to various items of content and/or various behaviors.

Embedding vectors are advantageously used since embedding vectors provide a reduction to the dimensionality of user behaviors, demographics, and/or preferences. Indeed, user behaviors may be tracked and associated with the users on a very fine-grained level of detail. This fine-grained detail of behaviors, demographics, and preferences/dislikes represents an extremely high degree of dimensionality. In short, in tracking user behaviors, demographics and preferences, the online service literally has a very specific information about any given user, and this specific information represents a high level of dimensionality, especially in the case of comparing these behaviors, demographics and preferences against another user. However, according to aspects of the disclosed subject matter, a trained machine learning model can be employed to reduce the high dimensionality of the behaviors, demographics, and/or preferences to significantly reduced and manageable degree of dimensionality.

To illustrate how a machine learning model is able to reduce a high dimensional space to meaningful, but manageable dimensional space, consider a small example: how many users on an online service, an online service that maintains images of various items, have viewed an image of a Ford Mustang car. In considering this, there are a large number of options that may be tracked by this exemplary online service: the year of the Mustang represented in the image, the color of the car, the configuration of the car (knowing that in several model years the car came in multiple configurations—hard back, convertible, fast back, etc.), the engine size of the car, the creature-comfort level of the car, manual transmission or automatic and if manual, 4-speed or 5-speed, and the like. When considering all of this information, there are literally hundreds of thousands of options, each of which the online service may be tracking per user (though not necessarily indexing and/or collating). However, this large dimensional space might be reasonably reduced to a single dimension, even a single bit: a Ford Mustang. According to aspects of the disclosed subject matter, the trained machine learning model processes the user information (behaviors, demographics, and preferences/dislikes) to reduce the dimensionality in generating embedding vectors. While one dimension of this reduced dimensionality may or may not be whether the user looked at a Ford Mustang, it could, depending on the training of the machine learning model. Sufficient, however, is the fact that a properly trained machine learning model can generate embedding vectors that reflect the behaviors and/or activities, demographics and preferences/dislikes of each user to a sufficiently accurate degree to provide meaningful results when identifying similarities among users.

Regarding the activities of block 202, it should be appreciated that this step may be conducted in an off-line, asynchronous manner to the rest of routine 200 described in FIG. 2. Accordingly, while listed as a first step in an ongoing process/routine 200, in an actual embodiment the functionality of block 202 is completed asynchronously to the remainder of routine 200. Moreover, embedding vectors may be periodically updated according to new and/or updated user information. For example, as a user continues to interact with the online service, a more accurate embedding vector may be warranted to also reflect the most recent user behaviors, new demographic information, and/or new preferences, likes and/or dislikes.

At block 204, the online service 112 receives a seed group 116 from an advertiser or vendor, such as vendor 114. As indicated above, the seed group comprises a set of users that is known to the vendor. Typically, this seed group comprises users that the vendor has identified as having specific, valued qualities that the vendor wishes to "duplicate" in an expanded set of users by the online service 112. However, according to aspects of the disclosed subject matter, the vendor does not expose the various values that the vendor used to select the seed group, but simply discloses the group of users to the vendor. In one embodiment, this disclosure includes the email addresses of the users in the seed group. It should be appreciated that rather than trying to map the user value taxonomy of the vendor to a user value taxonomy of the online service, which runs the risk of exposing information that the vendor should likely not reveal, the behaviors of users in the seed group and known to the online service are used to determine an expanded group of users.

At block 206, the online service 112 determines the intersection of the users of the seed group 116 to its corpus of users. According to various embodiments of the disclosed subject matter, this intersection may be based on the email addresses of the users of the seed group. According to aspects of the disclosed subject matter, while the intersection may be "based" on the email addresses of the users of the seed group, in various embodiments the email addresses themselves are not passed from the vendor 114. Instead, the passed values may correspond to hashed values of the actual email addresses, where the email address of each seed user is hashed according to a hashing function that is known. Generally, this hashing function employs a level of security such that, for a given user's email address, the hash function generates a unique hash value that can't be reversed back to the source email address. In this way, email addresses that are not already known to the online service 112 are not disclosed by the vendor 114 through the seed group.

Alternatively or additionally, the intersection between the seed group of the vendor and the corpus of users of the online service 112 may be based on other information provided by the vendor other than email addresses (or hashed values of the email addresses) including, by way of illustration and not limitation, name (given name), demographic data, and the like and associated with the users in the seed group 116. Using this information, the online service 112 can match at least one user (and typically more) in the seed group 116 to a corresponding user in its own corpus of users. As with the email addresses, all or some of the information, particularly personally identifying information or PII, may be hashed to unique values that can be used to compare for identifying users of the online service, but not cannot reversed to identify new, potential users not already known to the online service.

Realistically, while it is less likely that all users in the seed group are also in the corpus of users of the online service 112, it is likely that a statistically significant number of users are found in this intersection. By way of definition, the users identified as the intersection of users between the seed group 116 and the online service's corpus of users are referred to as "intersection users."

According to aspects of the disclosed subject matter, if the number of users within the intersection of users is below some particular threshold, the advertisement campaign may be terminated. For example, if the number of users within the intersection of users is less than the predetermined threshold amount, the advertisement campaign could (and often will be) terminated, or not even started. Advantageously, the purpose of this check on the number of intersecting users is to protect against abuse by third-party vendors and advertisers. More particular and by way of illustration and example, this protects against a vendor that would identify one good user (i.e., through an email address) and many fake or invalid users with corresponding invalid email addresses, used in an attempt to gain details from the online service regarding the one good user and/or to gather information regarding the online service's user base generally. By ensuring that a threshold number of users are found within the intersection, a degree or measure of anonymity and privacy is enforced.

At block 208, with the intersection of users identified, the online service 112 identifies an expanded set of users 120 that have similarities to the intersection users. Matching an intersection of users (i.e., a set of a plurality of users) to other users, a large group of users, to form an expanded set of users 120 is significantly more complicated than matching a single user to other users based on similarities of embedding vectors. By way of illustration and example, consider that a superstore may sell both gardening equipment and women's clothes. Its customers may have interest in either product, as an audience expansion algorithm should recognize. A poor algorithm (such as averaging all users) could easily conclude that the superstore's audience consists of customers looking to purchase 'women's clothes for gardening', which is very likely a small fraction of the true audience of the superstore. Accordingly, various exemplary steps for generating the expanded set of users 120 is described below in regard to FIG. 3.

Figure 3:
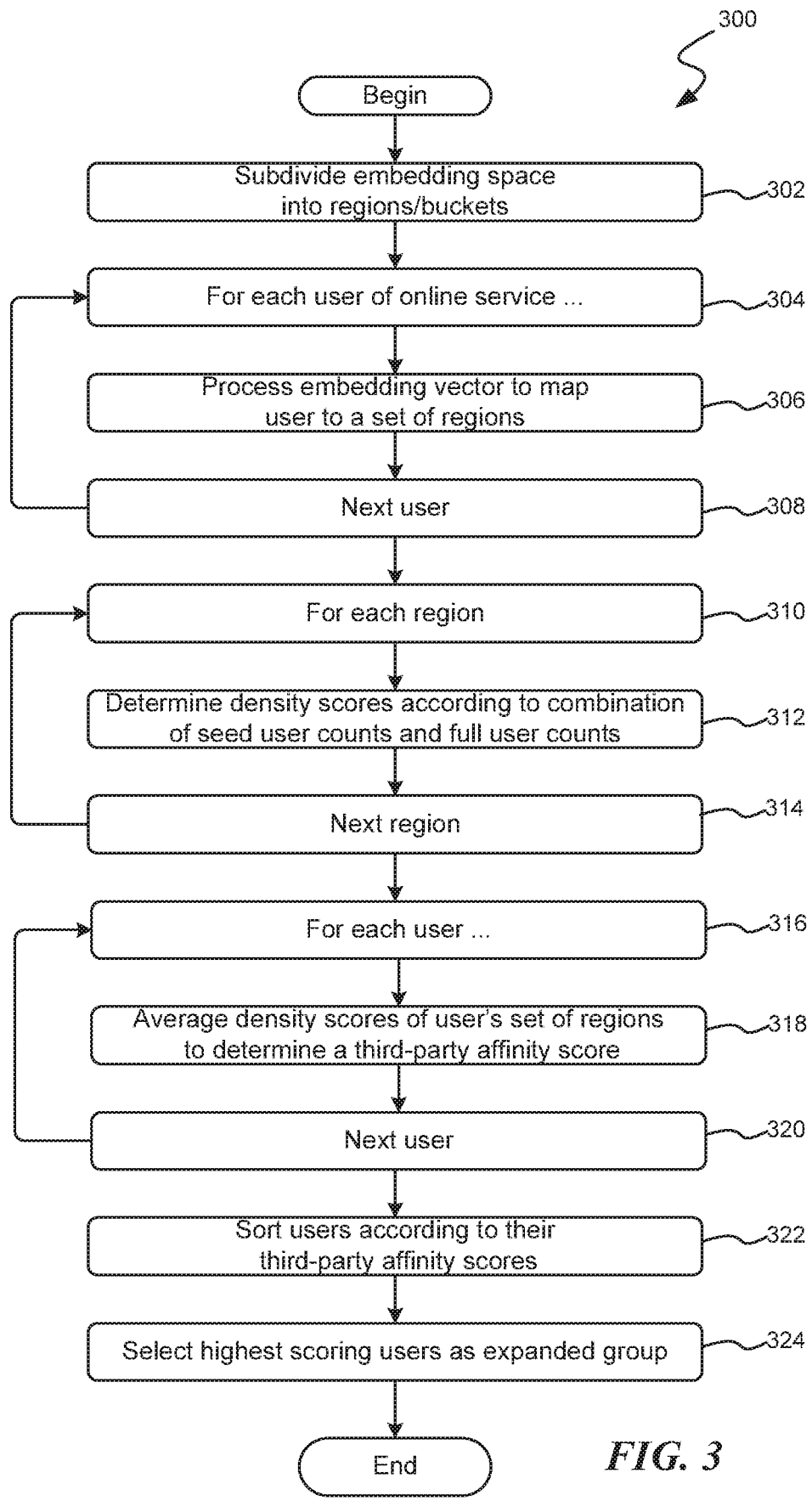
FIG. 3 is a flow diagram illustrating an exemplary routine suitable for generating an expanded set of users based on a seed group of users according to aspects of the disclosed subject matter.

Turning to FIG. 3, this figure shows a flow diagram illustrating an exemplary routine 300 suitable for generating an expanded set of users 120 from a smaller set of users, i.e., a plurality of users of a seed group. According to aspects of the disclosed subject matter, each user of the online service 112 has an associated embedding vector which can be utilized when identifying an expanded set of users.

As those skilled in the art will appreciate, an embedding vector (that captures the behaviors, likes, dislikes, etc.) of a user is often highly dimensional and "fine grained," meaning that it will capture information very specific to the user and the user's behaviors and/or activities. Due to the high dimensionality and fine-grained nature of these embedding vectors, it is difficult to identify similarities between users, even when matching a single user to many "similar" users. Additionally, while making comparisons among a small body of users, based on their associated embedding vectors, may be computationally feasible, such a practice does not scale. Indeed, in an environment where there are hundreds of millions, even billions of users to compare to, making computational evaluations among the entire body of users (based on embedding vectors) is entirely impractical.

To reduce the number of comparisons that must be carried out to determine matching/similar users, and according to aspects of the disclosed subject matter, as part of generating an expanded set of users, LSH techniques are employed. As those skilled in the art will appreciate, LSH reduces the number of comparisons that must be made by mapping the users to various "buckets," where the users within a "bucket" are viewed as having a high likelihood of being similar. In accordance with aspects of the disclosed subject matter, this mapping is carried out based on the embedding vectors of the users. As those skilled in the art will appreciate, LSH differs from conventional and cryptographic hash functions because LSH aims to maximize the probability of a "collision" for similar users.

As shown in FIG. 3, at block 302 the embedding space of the corpus of users of the online service is divided into regions or buckets. According to aspects of the disclosed subject matter, the embedding space corresponds to a hyperspace and the embeddings vectors of the corpus of users of the online service map to some point within this hyperspace. Additionally, the division of this hyperspace, conducted by LSH processing of the embedding vectors of the corpus of users of the online service, results in a predetermined number of regions or buckets into which the users of the online service 112 will be mapped.

Figure 4A:
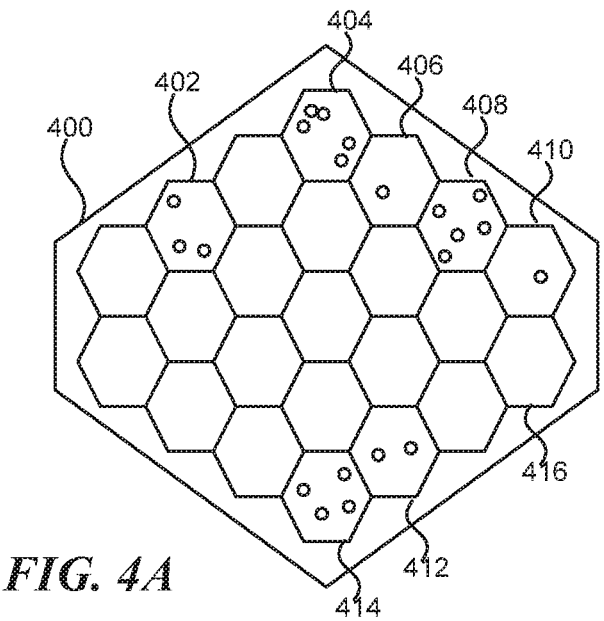
FIGS. 4A and 4B are pictorial diagrams illustrating an exemplary division of the embedding space into regions or buckets, and further illustrating the mapping users among the various regions or buckets of the embedding space, in accordance with aspects of the disclosed subject matter.
Figure 4B:
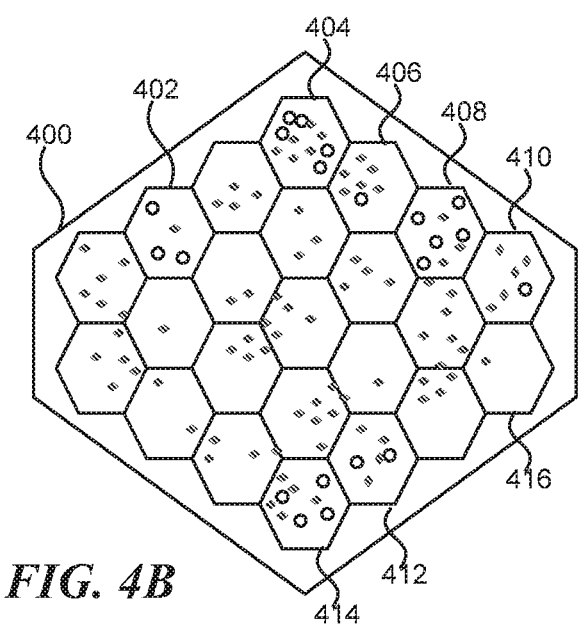

By way of illustration, reference is further made to FIGS. 4A and 4B. Indeed, FIGS. 4A and 4B are pictorial diagrams illustrating an exemplary division of the embedding space 400 into regions or buckets, and further illustrating the mapping users among the various regions or buckets of the embedding space, in accordance with aspects of the disclosed subject matter.

Regarding the embedding space 400 illustrated in FIGS. 4A and 4B, it should be appreciated that the particular shapes used to represent both the embedding space 400 and the various LSH-determined regions within the embedding space are selected for illustration purposes only and should not be viewed as actual representations of an actual, multi-dimensional hyperspace and/or LSH-determined regions within that space. Indeed, the illustration of regions as all being the same shape is for illustration and in most actual implementations, would not result in similarly sized regions. Similarly, while the regions are illustrated as hexagons, this too is simply for illustration purposes and, in most actual implementations, regions or buckets would not be hexagonal. However, for illustration purposes, the hexagons in FIGS. 4A and 4B represent the LSH-determined regions or buckets into which the users of the online service are mapped. Additionally, for illustration purposes, the circles within the subdivided embedding space 400 represent intersection users placed within a region, and the diamonds within the subdivided embedding space represent other users of the online service.

At block 304, an iteration loop is begun to iterate through each of the users of the online service. At block 306, the embedding vector associated with a currently iterated user is processed by the LSH functions. Moreover, according to various aspects and embodiments of the disclosed subject matter, this LSH processing is conducted multiple times for each user, where each processing results in the currently iterated user being mapped to a corresponding region or bucket. The set of mappings for each user may be viewed as a type of LSH signature for each user. Each user's LSH signature will be used to determine a third-party affinity score to the third-party vendor/advertiser, which scores will be used to identify the expanded set of users for the third-party vendor.

At block 308, a determination is made as to whether there are more users to process in the iteration loop. If so, the process 300 returns to block 304 to select the next user to map to a set of regions/buckets, as described above. Alternatively, once all the users of the online service 112 have been processed in this iteration loop, the routine 300 proceeds to block 310.

At block 310, another iteration loop is begun. According to aspects of the disclosed subject matter, this second iteration loop is carried out to determine density scores for each of the regions or buckets identified in block 302. At block 312, for the currently iterated region or bucket, a density score is determined. According to aspects of the disclosed subject matter, this density score is determined according to both the number of intersection users mapped to the region, as well as the overall number of users mapped to the region. In regard to this scoring, FIG. 4A illustrates an exemplary mapping of the intersection users (denoted by circles within the embedding space 400), from which "intersection scores" for the regions are determined. More particularly, in this example, the intersection scores are as follows: Region 402 scores a 3 (i.e., 3 intersection users mapped into the region), Region 404 scores a 5, Region 406 scores a 1, Region 408 scores a 5, Region 410 scores a 1, Region 412 scores a 2, and Region 414 scores a 4. Other regions, such as Region 416, each score a 0 and are generally not further evaluated in identifying or determining the expanded set of users.

After generating the intersection scores for the various regions within the reduced dimensionality space 400, at block 312 a density score for each region (typically, though not exclusively, only for regions with a non-zero intersection score) is determined. This density score is determined as a function of the intersection score and the overall number of users of the online service 112 that have been hashed or mapped to the region. By way of illustration, FIG. 4B illustrates both intersection users and other users (denoted by the diamonds) mapped into the various regions or buckets within the embedding space 400, and upon which the density scores are determined.

In regard to calculating or determining a density score for a given region, a density score is computed according to the following formula:

$$d_s(r_i) = \frac{c_{s,i} + \alpha}{c_{b,i} + \beta}$$

where $d_s()$ denotes the density scoring, $r_i$ denotes the region in the embedding space, $c_{s,i}$ denotes the intersection score (i.e., the number of intersection users in region $r_i$), $c_{b,i}$ denotes the total number of users of the online service mapped to the region $r_i$ (including both intersection users and other users), and $\alpha$ and $\beta$ denote smoothing values. Ignoring (for purposes of simplicity) the smoothing values, the density scores for each region are as follows: Region 402 scores a 0.75 (3/4), Region 404 scores a 0.45 (5/11), Region 406 scores a 0.14 (1/7), Region 408 scores a 0.63 (5/8), Region 410 scores a 0.17 (1/6), Region 412 scores a 0.33 (2/6), and Region 414 scores a 0.44 (4/9). Each of the density scores indicate the type of affinity of the third-party vendor or advertiser to that particular region. In this regard, density scores that are higher are viewed as being more important or having greater affinity to the third-party vendor or advertiser. In the example above, Region 402 (having a density score of 0.75) is viewed the most important region to the third-party advertiser for the seed group provided by the advertiser, followed by region 408 (having a density score of 0.63), etc.

According to aspects of the disclosed subject matter, regions that have fewer intersection users than a threshold number, and/or regions having fewer overall users than another threshold number may have their scores set to zero. For example, Regions 406, 410 and 412 may each be eliminated from further processing through setting their density scores to zero, each having too few intersection and/or overall users.

At block 314, if there are additional regions to process (i.e., determine density scores) within the embedding space, the routine 300 returns to block 310 for additional iterative processing. Alternatively, when density scores have been determined for each of the regions or buckets within the embedding space 400, the routine 300 proceeds to block 316.

At block 316, another iteration loop is begun to iterate through each of the users (at least those users that have been mapped to one or more regions having a non-zero density score) to determine an affinity score of the user to the third-party vendor/advertiser. Thus, at block 318 and with regard to a currently iterated user, the density scores of each region to which the user was mapped (as set forth in block 306) are averaged for the user, this average resulting in the affinity score of the user to the third-party vendor in view of the seed group of users provided to the online service.

At block 320, if there are additional users to process (for determining an affinity score), the routine 300 returns to block 316 where another user is selected for processing. Alternatively, once the iterations complete determinations of the affinity scores for all of the users (that have been mapped to a region with a non-zero density score), the routine 300 proceeds to block 322.

At block 322, the users (having affinity scores) are sorted according to the affinity scores. At block 324, the highest scoring users (excluding the intersection users) are selected as the expanded group of users. It should be appreciated that the number of users to select for the expanded group of users may be determined according to the number of users that are requested by the third-party vendor/advertiser.

After having selected users for inclusion in the expanded set of users, the routine 300 terminates.

It should be appreciated that while routine 300 illustrates one exemplary function for selecting users for the expanded set of users, other functions for selecting expanded users may also or alternatively be implemented. While likely less precise in determining an expanded set of users, as an alternative embodiment, the embedding vectors of the intersection of users are averaged to produce a representative vector for the third-party vendor/advertiser. This averaged, representative vector is then viewed as a "single user" and is used to identify an expanded set of users according to embedding vector similarities.

Returning to FIG. 2, after having identified the expanded set of users, at block 210, advertisement campaign information 118 is received from the advertiser/vendor. As those skilled in the area of online advertisements will appreciate, this advertisement campaign information includes information that is used by the online service to conduct the advertisement campaign on behalf of the advertiser/vendor. This information may include, by way of illustration and not limitation, the number of users to receive a corresponding advertisement, a strength of similarity of users to the seed group 116 of users, the budget corresponding to the advertisement campaign, the date or dates of execution of the advertisement campaign, the advertisement to be presented to the selected/targeted users, specific demographics of the selected/targeted users, conditions upon which the advertisement (or one of the advertisements of the advertisement campaign) is presented to a user, how many times an advertisement may be presented to a user overall and/or in a given time period, and the like.

It should be appreciated that while routine 200 presents the receipt of the seed group 116 of users (block 204) and the receipt of the advertisement campaign information 118 (block 210) as being conducted separately, this "separation" is for the presentation of particular elements of the routine 200 that are carried out by the online service 112, and should not be construed as limiting upon the disclosed subject matter. Indeed, in various embodiments, the seed group 116 of users and the advertisement campaign information 118 may be submitted to the online service 112 jointly.

At block 212, with the expanded set of users identified and in view of the advertisement campaign, the users of the expanded set of users is sorted or ordered. This sorting is carried out to identify those users that satisfy or most closely satisfy the parameters of the advertisement campaign as set in the advertisement campaign information by the vendor. At block 214, a group of target users are identified from the sorted/ordered expanded set of users. This group includes users that are to be targeted in the course of the advertisement campaign in accordance with the parameters specified by the vendor in the advertisement campaign information 118. This additional sorting or ordering may be based on various factors or user-related information such as, by way of illustration and not limitation, the likelihood of a given user responding to an advertisement, the likelihood of a user being online to respond to an advertisement, vendor/advertisement campaign criteria (e.g., age, gender, region, ethnicity, etc.), and the like At block 216, an advertisement campaign is carried out on behalf of the vendor, targeting those users of the targeted group of users defined and/or identified above. As those skilled in the art will appreciate, this advertisement campaign will be carried out by the online service 112 for the vendor 114 in accordance with the parameters specified in the advertisement campaign information 118.

At block 218, in addition to carrying out the advertisement campaign for the vendor 114, aggregated information of the target group of users may optionally be provided to the vendor/advertiser 114. Indeed, this aggregated information is typically generated to provide the vendor/advertiser general information about the targeted users while keeping certain specific information, such as personally identifying information (PII) from passing to the vendor. Keeping PII or other specific information from the vendor, identifying target users according to behaviors and information unique to the online service 112, yet carrying out an effective advertisement campaign for the vendor and providing aggregated information of the targeted users is highly advantageous and unique among platforms that carry out advertisements for others. Indeed, in this way, the online service can provide an efficient advertisement campaign to an expanded group of users without having to generate a mapping of taxonomies between advertiser interests and online service interests, as well as maintaining the confidences (i.e., PII) of the online service's users.

After conducting the advertisement campaign on behalf of the vendor/advertiser 114, and after having optionally provided aggregated information of the targeted group of users to the vendor, the routine 200 terminates.

As mentioned above in routine 200, the users of the online service 112 are each associated with an embedding vector based on each user's behaviors and/or activities, as well as demographics and personal tastes, preferences and dislikes.

According to various embodiments of the disclosed subject matter, these embedding vectors may be generated by a machine learning model trained to generate embedding vectors according to the proprietary, home-grown data of the online service. In regard to machine learning models, reference is now made to FIG. 5.

Figure 5:
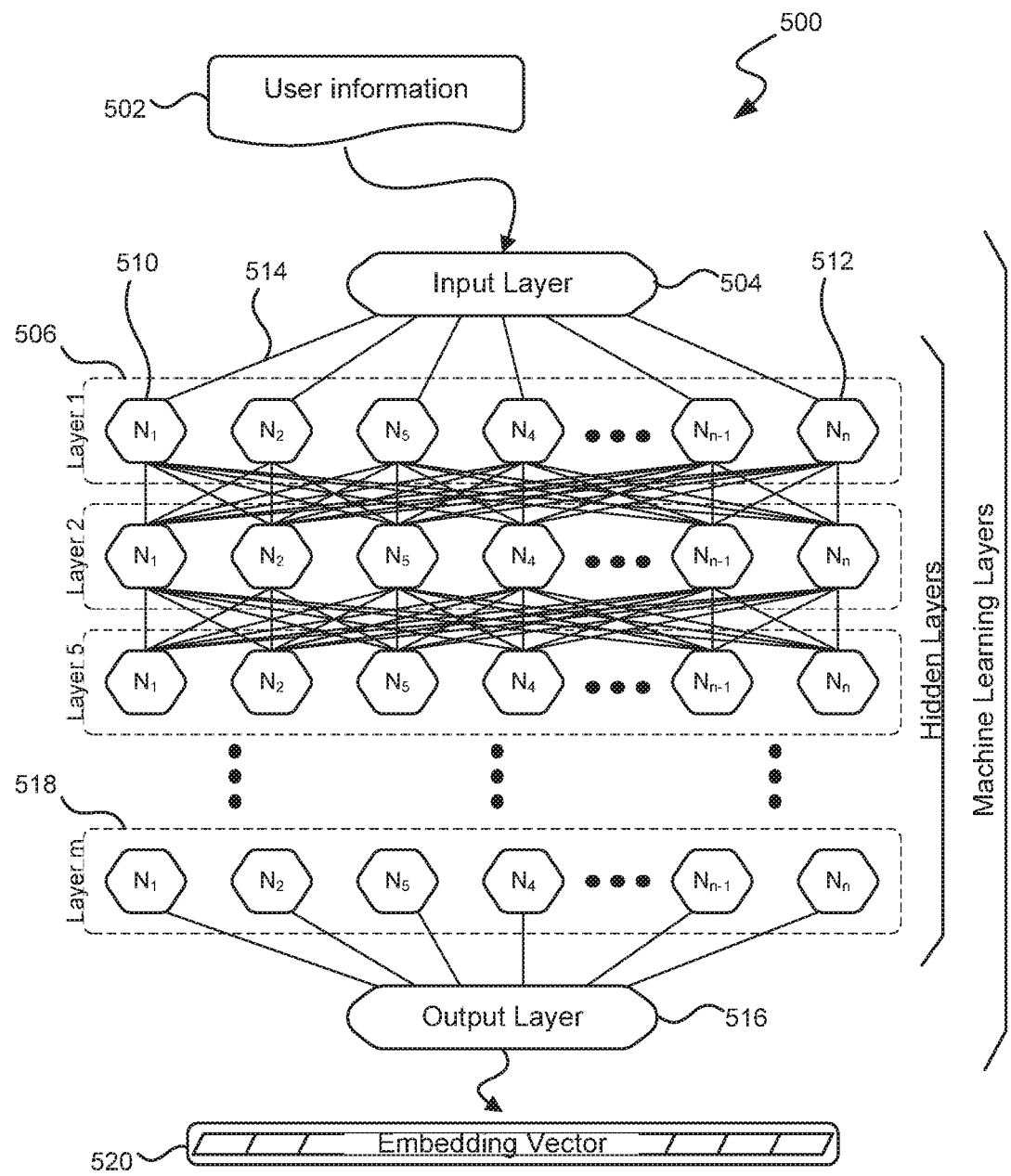
FIG. 5 is a block diagram illustrating elements of a deep learning/machine learning model suitable for generating embedding vectors for users of an online service in accordance with aspects of the disclosed subject matter.

FIG. 5 is a block diagram illustrating elements of a machine learning model suitable for generating embedding vectors for users of an online service 112, in accordance with aspects of the disclosed subject matter.

As those skilled in the art will appreciate, the machine learning model 500 (also known as a deep neural network) is a framework of executable components comprising multiple executable layers of processing nodes. The executable layers include an input layer 504, and output layer 516, and one or more hidden layers. For example, and by way of illustration in FIG. 5, the executable machine learning model 500 includes m hidden layers, including hidden layers 506 and 518. As suggested above, the input layer 504 accepts the input data which forms the basis for generating an embedding vector for the user. According to aspects of the disclosed subject matter, the input data for this matter is user information 502 that includes, by way of illustration and not limitation, the user's behaviors and activities on the online service, user demographics as known and maintained by the online service 112, preferences, likes and dislikes as may be provided by the user to the online service or that may have been implicitly determined, and the like. Based on this user information 502 the model 500 will generate a corresponding result: an embedding vector for the user.

The input layer 504 accepts the input data, in this case user information 502 and any other metadata that may be associated with the user as maintained by the online service 112, and according to one or more predetermined algorithms and/or heuristics, generates a plurality of intermediate values for one or more aspects, features and/or facets from that input data. These values (not illustrated but implied by the various edges, such as edge 514, extending from the input layer 504 to the various processing nodes of the first hidden layer 506) are output of the first layer and distributed as input data to processing nodes, such as processing nodes 510 and 512, in the first of the hidden layers of the executable model 500.

Typically, though not exclusively, a value/facet of the input data passed from the input layer 504 to a first processing node in the first hidden layer, such as processing node 510 of hidden layer 506, may be different than a value/facet passed to a second processing node of that same hidden layer, such as to node 512 of hidden layer 506. Of course, while model 500 suggests that there is 1:1 relationship between output values of the input layer and input nodes of the first hidden layer, this should be understood to be illustrative and not limiting upon the disclosed subject matter. Indeed, in various embodiments, all output values of a first given layer are provided as input values to each processing node in the next layer.

Each hidden layer comprises a plurality of executable processing nodes, each processing node carrying out some function that convolves the input data into output data. By way of illustration and not limitation, hidden layer 506 includes n processing nodes $N_1$-$N_n$. While the processing nodes of the first hidden layer 506 typically, though not exclusively, have a single input from the input layer, processing nodes of subsequent hidden layers typically have input values from one or more processing nodes of the previous input layer. As illustrated in executable model 500 though not intended as a limitation of the disclosed subject matter, each hidden layer (except for the first hidden layer 506) accepts input data/signals from each of the processing nodes of the prior hidden layer, as indicated by the edges proceeding from a processing node of an "upper" hidden layer (e.g., layer 506) to a "lower" hidden layer.

As mentioned, each executable processing node implements one or more "convolutions" or "computations" on the input data it receives (whether the processing node receives a single item of input data, or plural items of input data) to produce an output value (or, more simply, an output). These convolutions/computations may include any number of functions to generate the output data, such as (by way of illustration and not limitation) aggregations, clusterings, transformations, combinations, selections and/or filters, mathematical manipulations, linear and multivariate regressions, statistical determinations and predictions, and the like. Moreover, individual items of input data may be weighted such that a given item of input data plays a greater or lesser role in the overall computation of any processing node. Items of input data may be weighted in such a manner as to be ignored in convolution. Hyperparameters (data/values that are input from sources external to processing nodes of a prior input level) may also be utilized by all or some of the processing nodes of a hidden layer.

As will be appreciated by those skilled in the art, one of the interesting aspects of machine learning is that the various levels of the machine learning model are self-learning, meaning that when provided feedback regarding output accuracy, modifications are made to the weights, parameters, and processing of nodes in the various layers in order to achieve better results. Thus, except for initially established computations of the various processing nodes in a training phase of the machine learning process, a person is unlikely to have specific insight or knowledge as to the exact computations that any particular processing node of a hidden layer may utilize. This is especially true of unsupervised training models that determine the accuracy of data according to heuristics, rules and goals. During the training process of a machine learning process, the machine learning process makes its own determinations as to how to modify each computation to produce better/superior results for the input values it receives.

At the final hidden input layer, e.g., layer 518, the executable processing nodes provide their output values to the output layer 516. The output layer 516 performs its own convolutions or computations including, by way of illustration and not limitation, aggregations, calculations, normalizations and/or interpretations of the various items of input data to produce an output value of the model. In the illustrated example, the output layer 516 produces an embedding vector 520 that may be used as a concise, low dimensional reflection of the corresponding user as known to the online service 112. According to one embodiment of the disclosed subject matter, to produce the embedding vector 520, the output layer 516 aggregates and/or convolves together each item of output data from the final hidden layer 518.

As those skilled in the art will appreciate, in order to accurately generate embedding vectors for the users of the online service 112, the machine learning model 500 must be trained. Regarding the training of the machine learning model 500, reference is made to FIGS. 6 and 7.

Figure 6:
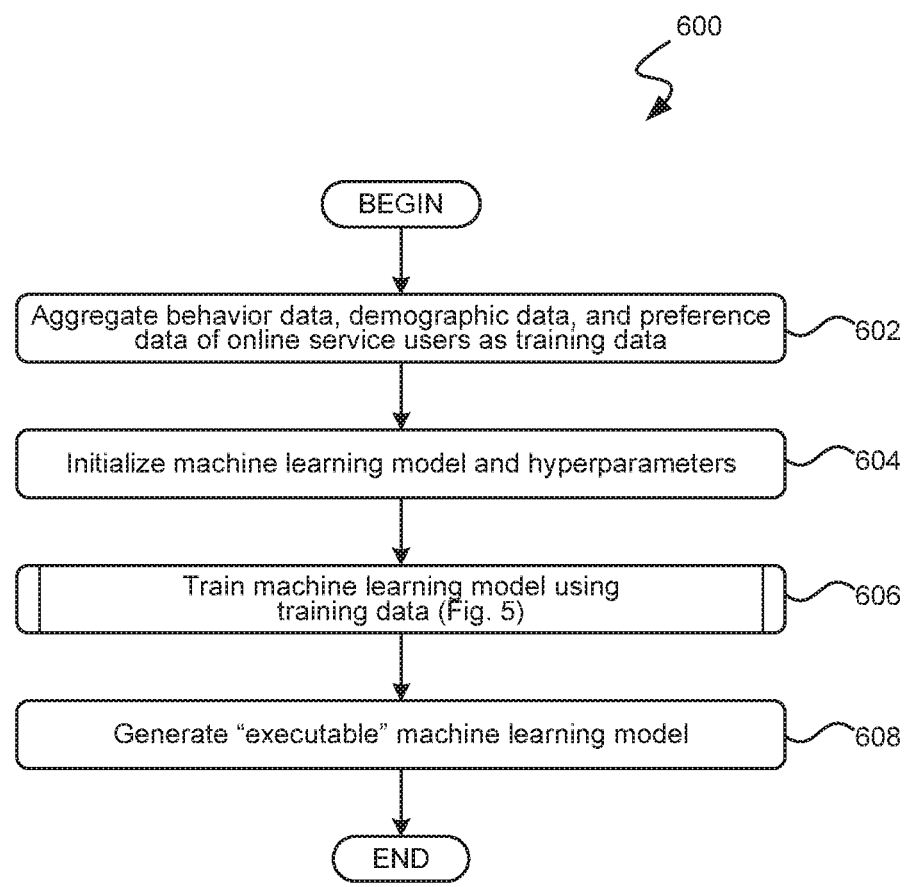
FIG. 6 is a flow diagram illustrating an exemplary routine suitable for use for training a machine learning model in generating embedding vectors for users of an online service in accordance with aspects of the disclosed subject matter.

Referring to FIG. 6, FIG. 6 is a flow diagram illustrating an exemplary routine 600 suitable for use for training a machine learning model, such as machine learning model 500 of FIG. 5, in generating embedding vectors for users of an online service 112 in accordance with aspects of the disclosed subject matter. Beginning at block 602, information regarding user behavior and/or activities, user demographic information, and user preferences and/or dislikes are aggregated for users of the online service 112 into user information records, each record corresponding to a user.

After generating training data comprising a set of user records, each record corresponding to a user of the online service 112, at block 604, the machine learning model 500 is initialized for training. Initializing the machine learning model may include, by way of illustration and not limitation, setting initial values and conditions for the processing nodes of the machine learning model 500, establishing and/or initializing any hyperparameters that may be needed or desired to assist in processing the input/training data, and the like.

At block 606, the input records are passed as training data to the machine learning model for training. Training the machine learning model is generally described in regard to routine 700 of FIG. 7. Regarding the training of the machine learning model and according to aspects of the disclosed subject matter, since there are no specific "right" and "wrong" answers to what the resulting embedding vectors entail, other than they accurately though concisely reflect the behaviors, preferences and demographics of the corresponding users, the machine learning model is trained in an unsupervised manner. Unsupervised training means that the machine learning model uses guidance, goals and validation metrics to determine whether the machine learning model is trained to generate accurate output results (embedding vectors) for users according to corresponding user information.

Figure 7:
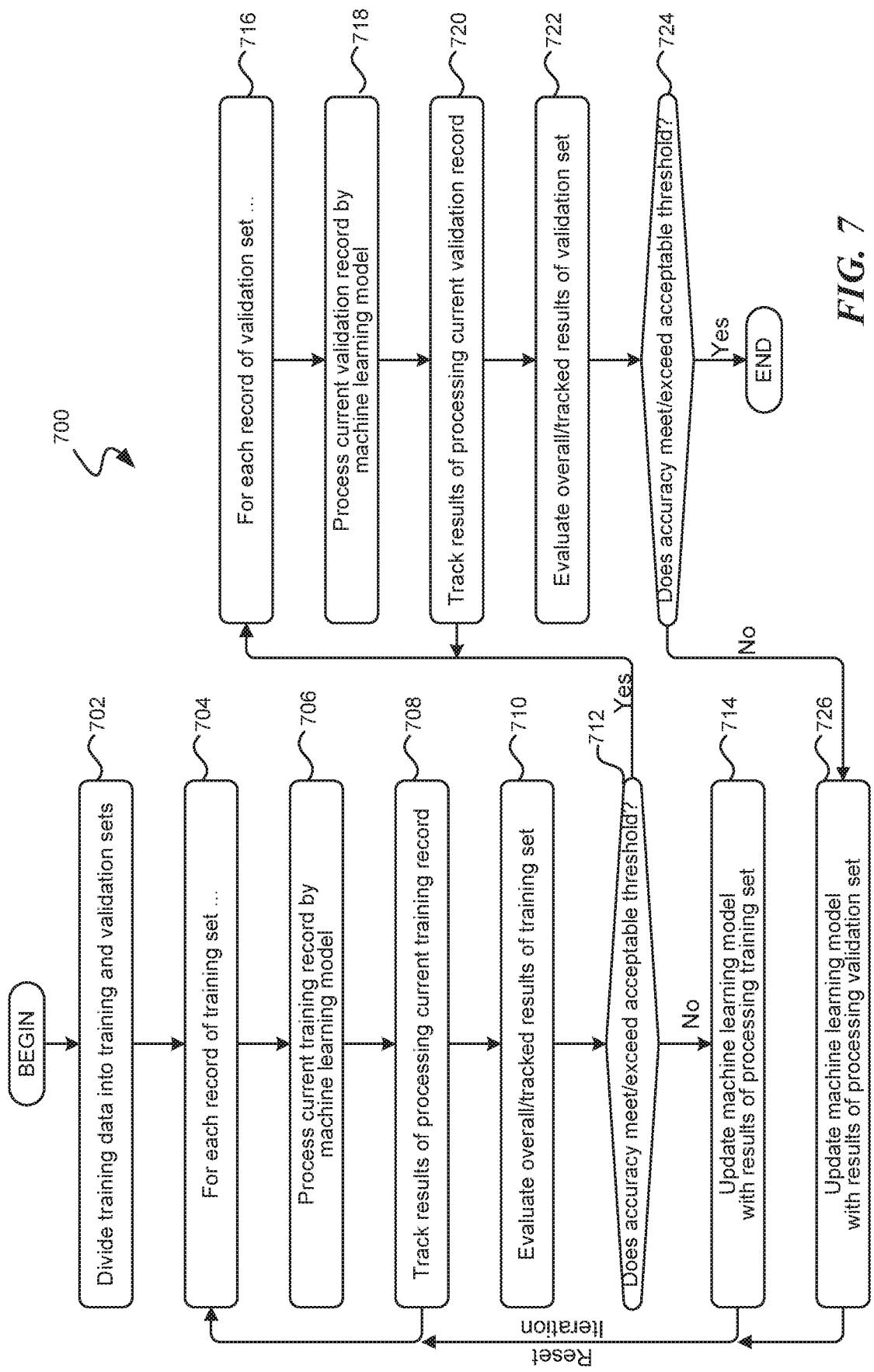
FIG. 7 is a flow diagram illustrating an exemplary routine suitable for use by a machine learning model for training the model in generating embedding vectors for users of an online service in accordance with aspects of the disclosed subject matter.

In reference to FIG. 7, FIG. 7 is a flow diagram illustrating an exemplary routine 700 suitable for use by a machine learning model for training the model in generating embedding vectors for users of an online service in accordance with aspects of the disclosed subject matter. Beginning at block 702, training data (as mentioned above) that will be used to train the machine learning model is divided into two partitions of training records: a training set and a validation set. The training records of each set are randomly selected from the body of training data.

As will be appreciated by those skilled in the art, the training set is used in the majority of the training of the machine learning model, while the validation set is used to validate or verify whether the machine learning model is accurately trained by the training data, and not just conditioned to the training records of the training set. Accordingly, it is not necessary that the training set and validation set be equal in size. Indeed, the validation set need only be sufficiently large as to be able to provide an accurate determination of whether the machine learning model properly maps the training data into a multi-dimensional space with suitable dispersion among the various dimensions.

At block 704, an iteration loop is begun to iterate through the training set of the training data. At block 706 and as part of the iteration, the machine learning model processes the currently iterated training record. As those skilled in the art will appreciate, processing the training record comprises providing the information, i.e., the currently iterated training record, to the machine learning model where it is processed as generally described above in regard to FIG. 5. In regard to processing the training record, the machine learning model, through its various layers, identifies elements of the currently iterated training record to use as an item of criteria in determining (as a product of the output layer) a score that can be plotted in a multi-dimensional space and suitable for determining clusters and dispersion.

At block 708, the results of processing the currently iterated training record are tracked, including recording results in the multi-dimensional space. This tracking, when aggregated, can be used to validate the results of the training of machine learning model and/or provide updated information for the training of the machine learning mode through a feedback process. As will be appreciated by those skilled in the art, this feedback process causes processing nodes in the various layers of the machine learning model to update and/or causes hyperparameters associated with the various layers and processing nodes to be modified.

Additionally, at block 708, if there are additional training records to process as part of the training set, the routine 700 returns to block 704 for processing the next training record in the course of the iteration loop. Alternatively, if all of the training records have been processed, the routine 700 proceeds to block 710.

At block 710, the results of the machine learning model (which reflect the current state of training of the machine learning model) are now evaluated to determine whether the trained model generates an appropriate mapping of records to a defined multi-dimensional space with good dispersion. This evaluation/determination results in an accuracy score indicating the overall accuracy of the machine learning model (as currently trained). With this accuracy score, at decision block 712, a determination is made whether a sufficient level of accuracy (i.e., does the accuracy score meet or exceed an acceptable threshold level) has been achieved through the training of the machine learning model.

If the current accuracy of the machine learning model does not meet the acceptable threshold, the routine 700 proceeds to block 714. At block 714, the tracked results (in view of the actual results) are used to update aspects of, i.e. "train," the machine learning model. These updates may include modifications to the various processing layers and/or to the various hyperparameters used at the various layers. After updating the machine learning model in view of the tracked results, the routine 700 then proceeds back to block 704 where the iteration of the training set is reset/reinitialized such that the training records are again processed by the machine learning model to further train the model.

With reference again to decision block 712, if the determination is made that the results have met the acceptable threshold level, the routine 700 proceeds to block 716. At block 716, an iteration loop is begun to iterate through the validation records in the validation set. This iteration of validation records is to now validate that the machine learning model hasn't been trained to simply respond to the pattern of the training records of the training set but, instead, has actually achieved a satisfactory/acceptable level of accuracy. As those skilled in the art will appreciate, it is not uncommon for a machine learning model, in the course of being trained, to generate acceptable results (threshold level of accuracy) on a training set only to fail to achieve that acceptable level with a validation set.

At block 718, the currently iterated validation record of the validation set is processed by the machine learning model to map the data into a multi-dimensional space with appropriate distribution, in similar manner as suggested above in regard to block 706. At block 720, the result of the processing is tracked and, if there are additional validation records to process, the routine 700 returns to block 716. Alternatively, if there are no additional validation records to process, the routine proceeds to block 722.

At block 722, the results (i.e., the predictive accuracy) of processing the validation set by the machine learning model, which reflect the current state of training of the model, are evaluated to determine wither the model maps information into the multi-dimensional space with good dispersion (i.e., that the distribution of the mappings is balanced among the various dimensions or values). This evaluation/determination results in a validation accuracy score indicating the overall accuracy of the machine learning model (as currently trained). With this validation accuracy score, at decision block 724, a determination is made as to whether a sufficient level of accuracy (i.e., does the validation accuracy score meet or exceed an acceptable threshold level) has been achieved by the machine learning model.

If, at decision block 724, the accuracy threshold is not met, the routine 700 proceeds to block 726. At block 726, the tracked results in processing the validation records are used to update aspects of, or train, the machine learning model. As mentioned above, these updates may include convolution and aggregation modifications to the various processing layers, processing nodes, and/or to the various hyperparameters used in the various processing layers and processing nodes.

After updating the machine learning model in view of the tracked results of the validation set, the routine 700 then proceeds back to block 704 to begin the entire process, starting with again processing the training set. Additionally, while not shown in FIG. 7, as an alternative to repeating the training process from block 704, the routine 700 could return to block 702 and randomly choose among the training data to establish a new training set and validation set from the training data.

With reference again to decision block 724, if the results (i.e., the validation accuracy score) of the validation set are determined to meet or exceed an acceptable tolerance, the routine 700 terminates, having sufficiently trained the machine learning model to the predetermined acceptable levels of accuracy. Of course, while not shown here, machine learning models can be subsequently trained to improve accuracy of a trained model based on additional information that may be provided over time. As suggested above, information regarding the mapping of records into a multi-dimensional space with good distribution may be used to further refine the machine learning model.

Returning back to FIG. 6, after having trained the machine learning model, the routine 600 proceeds to block 608 where an executable version of the machine learning model may be generated. This executable version does not suggest that the machine learning model that was trained is not executable, but rather that at least some, and often much, of the framework that is used in training the model, including functionality to update the model, modify parameters, nodes and processing layers, as well as tracking functionality, can be removed, resulting in an executable model that is both trained and that can operate more efficiently in generating its output/results.

After generating the "executable" machine learning model, the routine 600 terminates.

Regarding routines 200, 300, 600 and 700 described above, as well as other routines and/or processes described or suggested herein including the process described in regard to FIG. 1, while these routines and/or processes are expressed in regard to discrete, descriptive steps, these steps should be viewed as being logical in nature and may or may not correspond to any specific actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted. Optimizations of routines may be carried out. Those skilled in the art will recognize that the logical presentation of steps is sufficiently instructive to carry out aspects of the claimed subject matter irrespective of any particular development or coding language in which the logical instructions/steps are encoded. Additionally, while some of these routines are expressed in the context of recursive routines, those skilled in the art will appreciate that such recursive routines may be readily implemented as non-recursive calls without actual modification of the function or result. Accordingly, the particular use of programming and/or implementation techniques and tools to implement a particular functionality should not be construed as limiting upon the disclosed subject matter.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard to FIG. 9 below. Additionally, in various embodiments all or some of the various routines may also be embodied in executable hardware modules including, but not limited to, systems on chips (SoC's), codecs, specially designed processors and or logic circuits, and the like.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single- or narrowly-purposed applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted and/or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes.

Examples of computer readable media include but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 8:
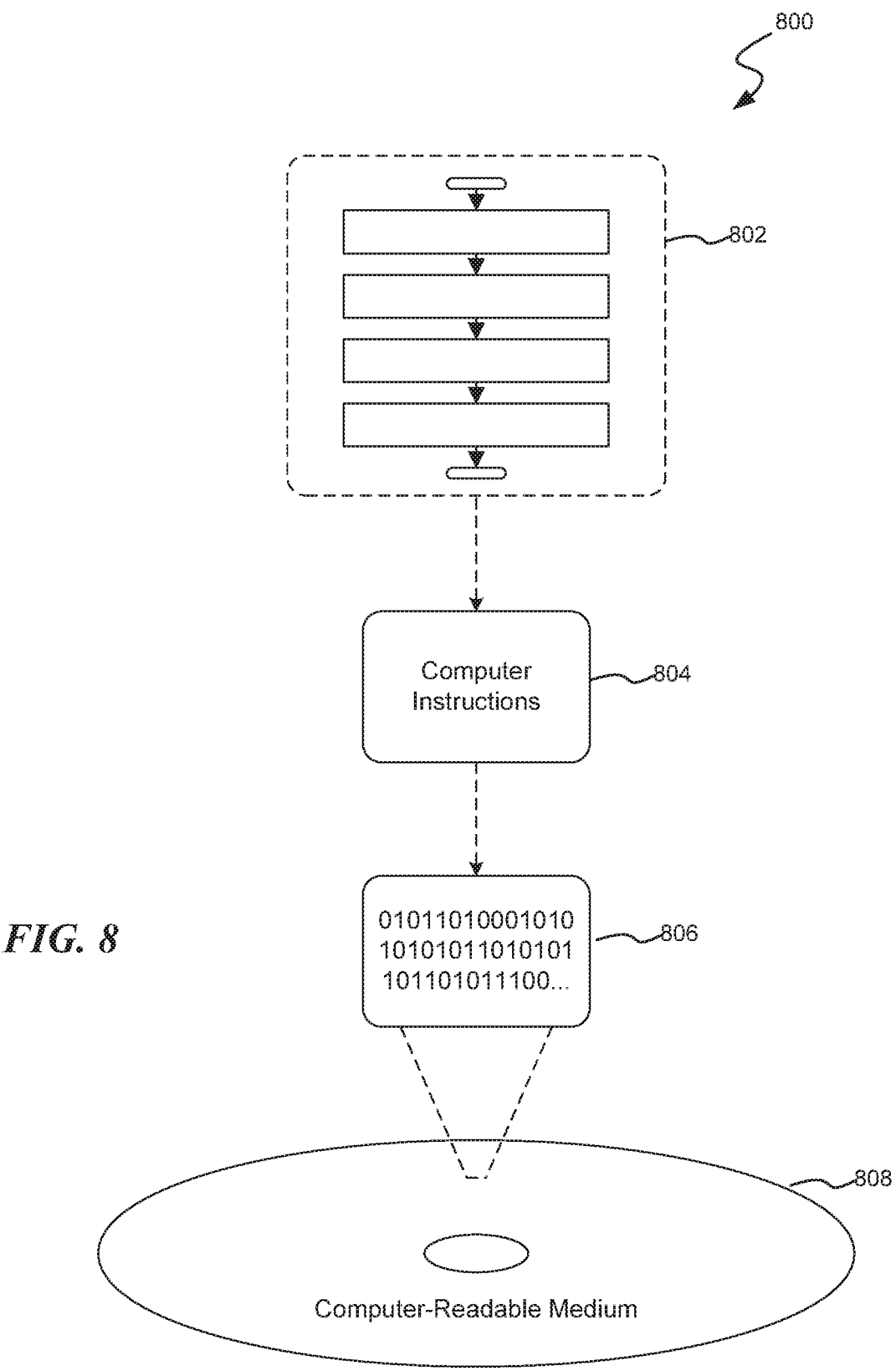
FIG. 8 is a block diagram illustrating an exemplary computer readable medium encoded with instructions for generating embedding vectors for users of an online service in accordance with aspects of the disclosed subject matter.

Regarding computer readable media, FIG. 8 is a block diagram illustrating an exemplary computer readable medium encoded with instructions for determining a likelihood score of an entity becoming an activity subscriber in accordance with aspects of the disclosed subject matter. More particularly, the implementation 800 comprises a computer-readable medium 808 (e.g., a CD-R, DVD-R or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as at least some of exemplary routines 200, 600 and 700, for example. In another such embodiment, the processor-executable instructions 804 may be configured to implement a system on a computing device, such as at least some of the exemplary, executable components of computing device 900 of FIG. 9, as described below. Many such computer readable media may be devised, by those of ordinary skill in the art, which are configured to operate in accordance with the techniques presented herein.

Figure 9:
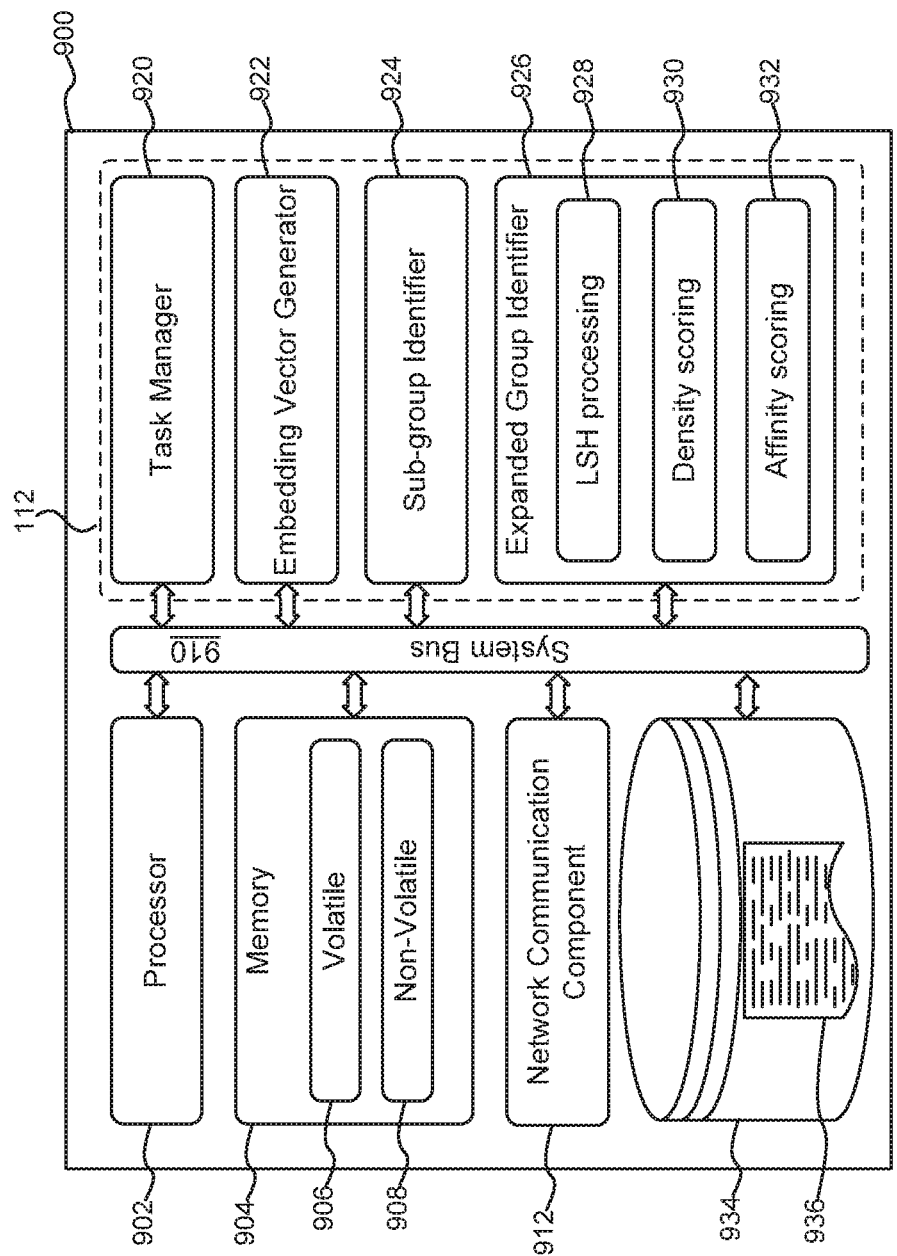
FIG. 9 is a block diagram illustrating an exemplary computer system suitably configured for implementing a system for predicting new activity subscribers according to aspects of the disclosed subject matter.

Turning now to FIG. 9, FIG. 9 is a block diagram illustrating an exemplary computing system 900 (or computing device) suitably configured for carrying out an advertisement campaign with an expanded set 120 of users according to aspects of the disclosed subject matter. The computing system 900 typically includes one or more central processing units (or CPUs), such as CPU 902, and further includes at least one memory 904. The CPU 902 and memory 904, as well as other components of the computing system, are interconnected by way of a system bus 910.

As will be appreciated by those skilled in the art, the memory 904 typically (but not always) comprises both volatile memory 906 and non-volatile memory 908. Volatile memory 906 retains or stores information so long as the memory is supplied with power. In contrast, non-volatile memory 908 is capable of storing (or persisting) information even when a power supply is not available. Generally speaking, RAM and CPU cache memory are examples of volatile memory 906 whereas ROM, solid-state memory devices, memory storage devices, and/or memory cards are examples of non-volatile memory 908.

As will be further appreciated by those skilled in the art, the CPU 902 executes instructions retrieved from the memory 904, from computer readable media, such as computer readable media 808 of FIG. 8, and/or other executable components in carrying out the various functions of the disclosed subject matter. The CPU 902 may be comprised of any of a number of available processors such as single-processor, multi-processor, single-core units, and multi-core units, which are well known in the art.

Further still, the illustrated computing system 900 typically also includes a network communication interface 912 for interconnecting this computing system with other devices, computers and/or services over a computer network, such as network 108 of FIG. 1. The network communication interface 912, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication component 912, is typically comprised of hardware and/or firmware components (and may also include or comprise executable software components) that transmit and receive digital and/or analog signals over a transmission medium (i.e., the network).

According to aspects of the disclosed subject matter the illustrated computing system 900 also includes (though not limited to) computer-executable modules of an online service 112 including, but not limited to, a task manager 920, an embedding vector generator 922, a sub-group identifier 924, an expanded group identifier 926 and a data store 934 that stores at least a list 936 of online service users/subscribers with corresponding embedding vectors.

In operation and execution, the task manager 920, also referred to as an advertisement manager, is responsible for obtaining requests from third parties, such as third-party vendor 114, that include both the seed group 116 and corresponding information or data describing a particular task to be carried out on behalf of the third party by the online service 112. This corresponding information make take the form of advertisement campaign information 118 that, as mentioned above, describes the parameters of an advertisement campaign to be conducted with regard to an expanded set of users, such as user set 120. In conjunction with the additional components of the computing system 900, the task manager 920 conducts an advertisement campaign on an expended set of users of the online service as indicated above.

In operation and/or execution on the computing system 900, the embedding vector generator 922 is configured to generate an embedding vector (or feature vector) for the users of the online service 112 according to their behaviors with one or more items and/or users of the online service. As mentioned above, utilizing the embedding vectors of the various users, an expanded set 120 of users can be identified from those users of a seed group 116 that are also users of the online service 112. This identification may be made according to groupings, similarities and/or commonalities found among the sub-set of known users to the online services overall group of users.

In operation and/or execution, and according to aspects of the disclosed subject matter, the sub-group identifier is used to identify the "sub-group" or intersection users: i.e., those users that are common between the seed group 116 and the online service's overall corpus of users. This identification may be based on information that is associated with the users of the seed group that is also maintained by the online service in a user list 936 that is stored in a data store 934.

As suggested above, in execution and/or operation on the computing system 900, the expanded group identifier 926, a logical, executable component, is configured to identify an expanded set 120 of users of the online service's corpus of users that have similarity to the seed group 116—as determined according to that sub-group or intersection of users common to both the seed group and the online service's corpus of users. As discussed above in regard to routines 200 and 300, this expanded set 120 of users is determined according to similarities as determined from the embedding vectors of the users. In other words, this expanded set of users is determined according to one or more combinations of their behaviors with the online service, explicit information provided to the online service from the users, and implicit preferences and dislikes as determined by the online service with regard to the behaviors of the users.

As shown in the exemplary computing system 900, the expanded group identifier 926 includes various logical, executable sub-components including an LSH processing component 928, a density scoring component 930, and an affinity scoring component 932. In execution, the LSH processing component 928 maps the multi-dimensional embedding space into a set of regions or buckets (as discussed above in regard to FIGS. 3, 4A and 4B), based on one or more hashing functions. Additionally, the LSH processing component 928 is used to map all users, including the intersection users, into the various LSH-defined regions in the embedding space 400.

The density scoring component 930, in execution, determines a density score for a given region according to the counts of the intersection users and all users mapped to the region, as set forth above in regard to routine 300 of FIG. 3. The affinity scoring component 932, in execution on the computing system 900, and as part of the online service 112, determines an affinity score for each of the users (at least those users that are in the regions having a non-zero density score) as an average of the density scores to the regions to which a user was mapped. This determination of affinity scores is set forth above in regard to routine 300.

While various novel aspects of the disclosed subject matter have been described, it should be appreciated that these aspects are exemplary and should not be construed as limiting. Variations and alterations to the various aspects may be made without departing from the scope of the disclosed subject matter. Moreover, while the disclosed subject matter has been described in terms of identifying an expanded set of users for conducting an advertisement campaign, aspects of the disclosed subject matter may be suitably applied to other uses, particularly in regard to carrying out one or more tasks on behalf of a third party, or even on one's own corpus of users. Indeed, the disclosed subject matter may be suitably applied to identifying users that, based on behaviors with an online service, would be likely interested in joining an interest group, an advocacy group, and/or a charitable institution. The disclosed subject matter may be suitably and advantageously utilized to identify users from its corpus of users that would be benefited from additional services.

What is claimed:

1. A computer implemented method, comprising:
   receiving, over a computer network and at an online service, a seed group identifying a plurality of users that are known to a third party and have a valued quality, wherein the seed group includes user-related information for each user of the plurality of users;
   in response to receiving the seed group, and through an execution of computer-executable instructions on a processor by the online service:
      determining an intersection of users between the plurality of users and a corpus of users of the online service according to the user-related information for each user of the plurality of users and user-related information for users of the corpus of users, wherein the intersection of users indicates users that are identified in both the seed group and the corpus of users, and does not include all users identified in the seed group;
      generating, for each user of the corpus of users, an embedding vector using a trained machine learning model having a plurality of executable layers of processing nodes and based at least in part on user behaviors of the user with the online service; and
      determining, using a locality sensitive hashing (LSH) algorithm, an expanded set of users from the corpus of users according to the intersection of users and the embedding vectors associated with each user of the corpus of users, wherein determining the expanded set of users using the LSH algorithm includes:
         mapping each user of the corpus of users to one or more regions of a plurality of regions within an embedding space according to the embedding vector associated with each user;
         determining a density score for each region of the plurality of regions as a function of a number of users of the intersection of users that are mapped to the region and a number of users of the corpus of users that are mapped to the region,
         wherein a region has a non-zero density score if at least one user of the intersection of users is mapped to the region;
         for each user of the corpus of users mapped to at least one region of the plurality of regions having a non-zero density score, determining an affinity score for the user as an average of the density scores of regions having a non-zero density score to which the user is mapped; and
         selecting a set of highest scoring users, as determined by their affinity scores, as the expanded set of users.

2. The computer implemented method of claim 1, further comprising executing an advertisement campaign to the expanded set of users on behalf of the third party.

3. The computer implemented method of claim 1, wherein determining the intersection of users is based, at least in part, on email addresses of the users of the plurality of users and email addresses of the users of the corpus of users.

4. The computer implemented method of claim 1, wherein determining the expanded set of users is based, at least in part, on one or more similarities between users of the corpus of users and users of the intersection of users.

5. The computer implemented method of claim 1, wherein the set of highest scoring users excludes users of the intersection of users.

6. The computer implemented method of claim 1, wherein the valued quality of the seed group is not received at the online service.

7. A non-transitory computer readable medium bearing computer executable instructions which, when executed on a computing system comprising at least a processor and a memory, carry out a method, comprising:
   generating, using a trained machine learning model having a plurality of executable layers of processing nodes, an embedding vector for each user of a corpus of users of an online service and associating the embedding vectors with the corresponding users, wherein generation of the embedding vectors is based at least in part on user behaviors of the corresponding users with the online service;

receiving, from a third party over a computer network, a seed group identifying a plurality of users that are known to the third party, wherein the seed group includes user-related information for each user of the plurality of users; and in response to receiving the seed group, and through the execution of the computer-executable instructions:

determining an intersection of users between the plurality of users and the corpus of users according to the user-related information for each user of the plurality of users and user-related information for the users of the corpus of users of the online service, wherein the intersection of users indicates users that are identified in both the seed group and the corpus of users, and does not include all users of the plurality of users; and determining, using a locality sensitive hashing (LSH) algorithm, an expanded set of users from the corpus of users based on the intersection of users and the embedding vectors associated with each user of the corpus of users, wherein determining the expanded set of users using the LSH algorithm includes:

mapping each user of the corpus of users to one or more regions of a plurality of regions within an embedding space according to the embedding vector associated with each user;

determining a density score for each region of the plurality of regions as a function of a number of users of the intersection of users that are mapped to the region and a number of users of the corpus of users that are mapped to the region, wherein a region has a non-zero density score if at least one user of the intersection of users is mapped to the region;

for each user of the corpus of users mapped to at least one region of the plurality of regions having a non-zero density score, determining an affinity score for the user as an average of the density scores of regions having a non-zero density score to which the user is mapped; and selecting a set of highest scoring users, as determined by their affinity scores, as the expanded set of users.

8. The computer readable medium of claim 7, wherein determining the intersection of users is based, at least in part, on email addresses of the users of the plurality of users and email addresses of the users of the corpus of users.

9. The non-transitory computer readable medium of claim 7, wherein the set of highest scoring users excludes users of the intersection users.

10. The non-transitory computer readable medium of claim 7, further comprising executing an advertisement campaign to the expanded set of users on behalf of the third party.

11. A computing system comprising a processor and a memory, wherein the processor executes instructions stored in the memory and causes the computing system to, at least:

generate, using a trained machine learning model having a plurality of executable layers of processing nodes, an embedding vector for each user of a corpus of users of an online service operating on the computing system, wherein generation of the embedding vectors is based at least in part on user behaviors of each corresponding user with the online service;

receive, over a computer network from a third party, a seed group identifying a plurality of users that are known to the third party, wherein the seed group includes user-related information for each user of the plurality of users;

determine a sub-group of users between the plurality of users and the corpus of users, the sub-group of users indicating users that are identified in both the seed group and the corpus of users of the online service, and does not include all users of the plurality of users; and determine, using a locality sensitive hashing (LSH) algorithm, an expanded set of users from the corpus of users based on the sub-group of users and the embedding vectors associated with each user of the corpus of users, wherein determining the expanded set of users using the LSH algorithm includes:

mapping each user of the corpus of users to one or more regions of a plurality of regions within an embedding space according to the embedding vector associated with each user;

determining a density score for each region of the plurality of regions as a function of a number of users of the intersection of users that are mapped to the region and a number of users of the corpus of users that are mapped to the region, wherein a region has a non-zero density score if at least one user of the intersection of users is mapped to the region;

for each user of the corpus of users mapped to at least one region of the plurality of regions having a non-zero density score, determining an affinity score for the user as an average of the density scores of regions having a non-zero density score to which the user is mapped; and selecting a set of highest scoring users, as determined by their affinity scores, as the expanded set of users.

12. The computing system of claim 11, wherein:
the user-related information includes an email address for each user of the plurality of users; and
the sub-group of users are determined according to the email addresses of the users of the plurality of users and email addresses of the users of the corpus of users.

13. The computing system of claim 12, wherein the expanded set of users is determined based on the sub-group of users according to, at least in part, the embedding vectors associated with the users of the corpus of users.

14. The computing system of claim 11, wherein execution of the instructions further cause the computing system to execute an advertisement campaign to the expanded set of users on behalf of the third party.

* * * * *